March 6, 1951 C. C. HERITAGE 2,544,019
MANUFACTURE OF PLASTIC-FIBER COMPOSITION
Original Filed Nov. 13, 1944
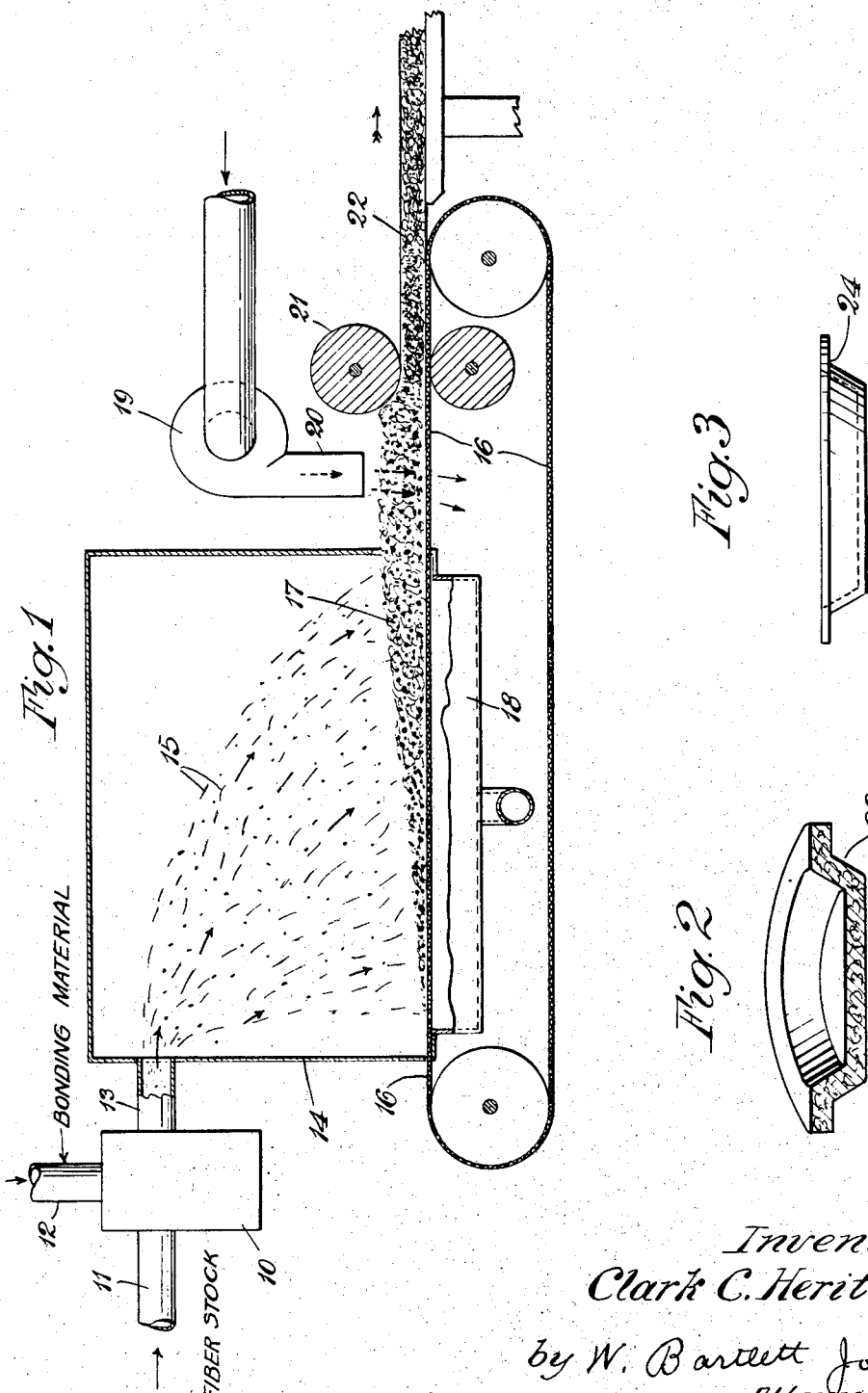
Inventor
Clark C. Heritage
by W. Bartlett Jones,
Attorney.

Patented Mar. 6, 1951

2,544,019

UNITED STATES PATENT OFFICE 2,544,019

MANUFACTURE OF PLASTIC-FIBER COMPOSITION

Clark C. Heritage, Cloquet, Minn., assignor to Wood Conversion Company, St. Paul, Minn., a corporation of Delaware Original application November 13, 1944, Serial No. 563,209. Divided and this application June 21, 1945, Serial No. 600,696

8 Claims. (Cl. 154—101)

This invention relates to compositions of plastic and fibers. One object of the invention is to provide improved methods of manufacturing fiber containing molding material for the plastics art, preferably in sheet form and with fibers consisting principally of cellulose or ligno-cellulose fibers such as wood fibers.

Another object of the invention is to provide a novel plastic-fiber composition in a form that is convenient to handle, being rigid or flexible, and which can readily be cut to size for use in molding dies used in the plastics art.

The improved method of making the novel composition is characterized by intermixing dry fibers with a binder to provide initially a fiber mat of low density within which the binder material is distributed in particle or other finely divided form or even as coatings on the fibers. The binder material when present as loose particles, distributed within the fiber mass or mat, is suitably activated to produce adherence of the binder material to the fibers to prevent displacement or migration of the particles within the mat, or loss from the mat, and to impart to the mat a strength above that afforded by the initial felting of the fibers resulting from the original mat formation. The mat is thereafter preferably densified or preformed to provide a body of convenient form for molding purposes. The degree of preforming or densification may be varied depending on the intended modes of use, but generally the preformed material will be in slab or sheet form, or in special shapes, for fitting in dies used in finally forming the finished molded articles. The density of the preformed material preferably is less than that which gives rigidity to the material, but is sufficient to reduce substantially the initial bulk of the fiber mass and thereby provide a molding composition that is sufficiently tenacious to withstand handling without disintegration, and is not too bulky to be used satisfactorily in conventional plastic forming dies. The "preform" also may be such in density as to permit shifting of its content when being finally molded.

The improved method is distinguishable generally from common prior methods of molding dense cellulose fiber products in that in forming the initial fiber mat with interspaced binder material, such as particles, an air dispersion rather than a water suspension of the fibers is utilized, and hence the process steps involved in drying the fibers deposited from a water suspension are avoided by the present improvements, and bulkier initial mats may be felted. Water-soluble binder material may be employed without loss. Commonly, such drying involves heat which unfavorably advances a thermosetting resin binder, and causes water-soluble resin to migrate to the surfaces, thus introducing difficulties into the whole process.

In the accompanying drawing Fig. 1 is a diagrammatic view of one form of apparatus with which the improved method may be carried out.

Fig. 2 is a sectional view of a preformed article of the improved molding material.

Fig. 3 illustrates an article formed from the preform shown in Fig. 2.

In carrying out the improved process, cellulose or ligno-cellulose fibers are employed. The fibers are individualized and dispersed in gas, such as air, by any suitable means such as a Prater mill, or other fiber or dispersing apparatus into which an adequate stream of air is delivered to provide an air suspension of the substantially individualized fibers. Fiber stock may be passed through a blower or through suitable brush rolls to further individualize the fibers and provide an air dispersion thereof. Dry fibers are preferred. Air-dry fibers have about 10% moisture content, and this may be increased to an appreciable moistness, thus to weight the fibers and aid or control the felting thereof, or guard against the danger of static electricity.

To the fiber dispersion or during the fiber dispersing process effected by the apparatus employed, a suitable and preferably a matrix-forming quantity of binder is added in finely divided form. The binder may be such as to give required characteristics to the final molded product but preferably is a heat softenable material, which becomes suitably plastic and tacky or adherent upon being heated, even though such condition be temporarily, as in the case of thermosetting resins. Suitable materials are: a phenolic-aldehyde resin, gilsonite, pitch, natural and petroleum asphalts and resins, rosin, ester gum, abietic acid, shellac, protein-base compositions and many other natural and synthetic resins and their derivatives, and like materials, which are normally solid when cold, adhesive when hot, and are either thermoplastic or thermosetting when heated.

The finely divided binder or matrix-forming material is added to or is present in the gaseous fiber dispersion for effecting a uniform distribution of the binder materials within the initially formed low-density fiber mat. The binder material may be added in finely divided form to loose wood fibers, and an air dispersion of the mixture may be effected for deposition upon a suitable fiber-receiving member. If desired the binder in normally solid form may be introduced into a defiberizing machine for comminution thereby concurrently with the individualization of the fiber stock, and the resulting finely divided binder and the individualized fibers may be dispersed into air or gas for a felting operation, as by introducing it into a fiber-settling chamber.

In Fig. 1 of the drawing, 10 indicates any suitable defibering apparatus into which fiber stock in felted sheet, flocculent, or chip form may be introduced at 11. Pulverized or comminuted matrix-forming material may be introduced into the apparatus 10 through duct 12. The resulting finely divided binder and individualized fibers preferably homogeneously mixed, are conveyed from the machine through the duct 13 into a settling chamber 14 in which the commingled binder and fibers are dispersed as indicated at 15. The fibers and binder settle upon an endless receiving member such as a screen 16 and form a low density mat indicated at 17. The density of the mat will vary depending on the conditions under which the fibers and binder material are deposited. For example, the density will be greater if the velocity of the fibers and the binder material is increased by projecting the same downwardly into the chamber rather than horizontally as indicated. Likewise the use of a suction box 18 beneath the screen will accelerate the descent of the fibers and binder material and increase the initial density of the resulting mat to some extent.

In passing the fibers and the heat-softenable matrix-forming binder material through the defibering mill 10, sufficient air is introduced into the mill not only to provide an adequate dispersion of the individualized fibers within the settling chamber, but to prevent a rise of temperature within the mill sufficient to soften the binder to the extent that it may become tacky, inasmuch as it is desirable to effect a substantially uniform distribution of loose binder particles throughout the initially formed mat 17.

The mat 17 shown in Fig. 1 when deposited in a gravity settling chamber may have a density of about one pound per cubic foot. Such a mat being fluffy in texture and without substantial strength-giving interfelting of the constituent fibers, cannot be handled freely without rupture and without tending to disturb the uniformity of the binder distribution within the fiber mass. For the purpose of integrating the mat while immobilizing the distributed binder particles within the mat, the particles are activated to adhesiveness to cause the same to adhere to the contiguous fibers. This is the first functioning of the matrix material, and its first binding function. Such softening of the particles may be effected by passing the mat through a heating zone which may be provided by a blower 19 having an outlet 20 which directs a gentle stream of hot air downwardly through the porous mat as shown in Fig. 1, while avoiding mechanical dislocation of the particles.

Where the matrix material is thermoplastic, as distinguished from being thermosetting, the application of heat may be prolonged, as in an oven. But where it is thermosetting, and where continued exposure to heat causes loss of plasticity, the heating step should be rapid to avoid advancing the material too far toward its final set. Hence a passage of hot air through the mat is preferred. A suitable softening temperature may be provided by other means as by the application of high frequency dielectric heating.

Since the binder material is of a character that is softenable by heat, the hot air flowing through the fibers renders the binder particles tacky and unites the fibers at multitudinous points within the fiber mass, thus giving substantial strength to the mat and immobilizing the binder particles to prevent migration of the latter through the mass and loss thereof from or stratification within the lower portion of the mat. By preserving the original distribution of the particles or masses within the mat, the original ratio of fibers to binder material is not altered by handling and cutting the material for placement in the dies or molds, nor by using sections of less than the original thickness, nor in making use of scraps of the plastic-fiber composition in molding operations.

The mat may be compressed during the heat-activation of the binder, or thereafter. Thus the thickness is variable from that of the thickness at formation, to lesser values effected by compression. It is also pointed out that the binder material which is softenable by heat may be in a stage where it acts like a pressure-activated adhesive, so that adequate mechanical compressing or densifying of the mat will effect the desired binding action. This is considered to be a binding action under activating conditions of temperature and pressure between binder and fiber.

The heating of the mat by a current of hot gas for effecting a softening or advancing of the binder to render the same adhesive is facilitated by the low density and resulting porosity of the dry fiber mass. As a result dislodgment and loss of the adhesive particles, when the mat is subsequently subjected to vibration or impacts in handling or in further processing, is avoided.

The fiber mass as initially formed within the chamber being of relatively low density, preferably is preformed or densified before use in molding operations. The densification of the mat increases its strength and better enables it to withstand handling without disintegration, whether it is to be marketed in sheet, roll or other form. The reduction of bulk better adapts the mat for use in conventional plastic forming dies in subsequent molding operations.

Preforming or densification of the bonded mat may be accomplished by passing the same between compression rollers, between platens or in presses, or the mats may be cut up into sections and the pieces compressed in preforming dies which give them the shape required for fitting into final or finishing dies that mold the sections into final form. The temperature and hence the adhesive condition of the binder during densification of the mat is a control over the physical properties of the resulting preform. In Fig. 1 of the drawing the mat 17 is shown passing beneath a preforming or compressing roll 21 which very materially reduces its bulk, effects further interfelting of the fibers and produces a relatively smooth-surfaced blanket 22 which constitutes a "preform" of the plastic-fiber composition of the present invention. The preforming of the mat by compression may be effected with or without heat and may be varied in degree depending on the intended uses of the preformed blanket or molding material. Where the final molded product is to be in sheet form, for example, the preforming and final compression steps may be combined in one or in successive operations and the relatively low density mat 17 may thus be converted into a relatively dense, tough finally-molded sheet having a density for example of 80 pounds or more per cubic foot.

The low-density mat subjected to heat to fix the binder particles therein, is not limited in density, but rather is limited in its porosity, and the latter is limited by the fineness of the particles of binder. When the mat having particles of binder is of such low density that it has a porosity permitting unfixed particles of binder to escape readily therefrom, or shift position therein, it is a mat of low density for the step of employing heat to immobilize the binder relative to fiber.

When marketed in blanket form, the preform can be cut to proper size and shapes for use in dies and compressed to hard final form in a manner similar to the use of conventional powdered or granular plastic composition. If desired, instead of preforming or densifying the mat 17 into the form of a sheet 22, the material may be cut to size and the pieces placed in preforming dies to shape them for fitting later in the finishing dies which complete the formation of the molded products. For example, in Fig. 2 of the drawing, there is shown a shaped preform 23 compressed or semi-molded for fitting within a die which will transform the preform of Fig. 2 into the relatively dense finished article 24 of Fig. 3. In other words, after the initially formed mat has been heat-treated to immobilize the particles within the fiber mass, it may be densified by semi-molding to the form shown in Fig. 2, or it may be compressed in sheet form as shown in Fig. 1, the sheets being later cut up in necessary shapes and sizes for use in the final dies. The blanket 22, already a preform, may be additionally compressed or shaped, by pressure or heat and pressure, to provide a different preform, for example, that of Fig. 2.

Other techniques of handling the plastic-fiber mat may be employed within the scope of the present improvements. The preformed blanket 22, or the semi-formed article such as that shown in Fig. 2, preferably is given a density that represents a substantial reduction in the bulk of the initially formed fiber mat and provides a product which, while flexible, can be handled without likelihood of rupture, and which can be cut into shape subsequently when desired for placement in molds or dies for final molding operations. The preforming or densification preferably is such as to reduce the original bulk substantially and effect material inter-felting of the fibers to give strength to the mat, but is less than that which gives the material such rigidity that fracturing will occur during subsequent handling or molding operations. A density of from 4 to 40 pounds of plastic fiber composition per cubic foot has been found suitable for the commercial saleable preform having by weight 65% fiber and 35% binder.

The invention embraces, in addition to the use of a settling chamber and related apparatus described above, other methods of depositing the plastic fiber composition in low density mat form. For example, granular heat-softening binder material may be introduced with chips into a suitable defibrator machine that operates preferably at a temperature lower than the softening temperature of the bonding material, or at the same or higher temperature, from which machine the fiber material issues in clotted bulk form with the granular material distributed with high uniformity therethrough where it has not softened, or anchored to the fiber where it has softened. Individualization of the fibers is secured by passing the fibers and the material through a Prater Mill to a cyclone collector from which the fibers issue in individualized form and with the granular bonding material distributed throughout the fiber stream. This stream may be passed to a high-velocity, low-concentration pneumatic feeder which delivers the fiber-binder dispersion to a suitable felt forming apparatus as between two endless wire screens of a low-pressure felter which forms a mat of the deposited fiber-binder material, the mat having a density preferably from 3 to 4 pounds per cubic foot. The low-density mat may then be heat treated, as above described, to activate the matrix or bonding material to adhesiveness and render it immobile relative to the mat which thereafter, or concurrently with the heat treatment, may be densified, as by roll compression, to provide a preform felt of a density of from 4 to 40 pounds per cubic foot. The preform thus provided is ready to be marketed as such and may be converted, by hot pressing, for example, into "hard board" or into various molded products.

If desired the fibers and distributed binder or material, instead of being delivered by the blower to a gravity chamber, as first above described, may be delivered to a collector which feeds the composition of fibers and distributed granular binder material to a picker roll spreader which deposits the fibers and binder material on a suitable endless belt or wire screen receiver to form a mat of less than 1 pound per cubic foot density. The mat may then be roll-compressed to about 3 pounds per cubic foot density and heat-treated to activate the binder material to adhesiveness and thereafter roll-compressed or otherwise densified to provide a preform of from 4 to 40 pounds density, for example, 15 pounds per cubic foot.

The above illustrated or described modes of, and apparatus for, providing fibers in individualized form from which the low density, porous mat is initially formed are but illustrative, rather than limitative, of the present invention. If desired, the method may be employed in practicing the present improvements wherein fibers are maintained in circulation at a suitable velocity in a closed or a substantially closed system and from a portion of which system individualized fibers may be withdrawn intermittently or continuously for deposition in mat form or for delivery to a pressure packing unit.

In using the improved plastic-fiber composition in three dimensional molds where the stock comprises sulphite fiber and a binder material, the following procedure may be employed if desired: The fiber stock, in the presence of a solid phenolic resin, may be passed through a Prater mill to individualize the fibers and comminute the resin to a suitable fineness, and is then passed through a cyclone collector. The individualized fibers and a distributed binder or matrix material may then be collected in a gravity depositing chamber or by other apparatus for heat treatment to fix the binder and thence fed to a blower which delivers the fiber-matrix material to a pneumatic or other packing station where a felt of suitable density, such as 2 pounds per cubic foot, is deposited in a three dimensional mold. The composition in the mold may thereafter be compressed, with or without applied heat depending upon the character and temperature of the binder present, to a preform having a density of from 4 to 40 pounds to render it handleable without objectionable disintegration for use in a final or finishing mold which by hot pressing densifies the preform into the final commercial or usable product.

In the description of the above mentioned preforms and the method of making the same, heat-softenable bonding materials have been contemplated, but the use of pressure-sensitive bonding materials may be employed, and where pressure sensitive materials are used, initial densification of the fibers employed, depending on characteristics desired in the final product, can be effected by use of pressure alone unaccompanied by the application of extraneous heat. Certain forms of rubber, pitch, bituminous compositions and coal tar resins are known examples of materials that exhibit plastic flow and adequate adhesiveness under pressure to render them useful as binders in the formation of preforms and as matrix formers in high pressure molding of the preforms into final products.

The quantity of binder employed as well as the character of the binder may be varied in accordance with desired characteristics of the final molded product. Where the quantity of phenolic type binder, all of which is flowable, is approximately 35% or more of the total weight of binder and cellulosic fiber, the material can be converted by heat and pressure by conventional plastics practices into hard, dense, glossy products, wherein the resinous component predominates superficially and constitutes a matrix for the fibrous component. Where the final product has no voids, the said 35% content of flowable binder is approximately the critical content between a fibrous surface at a less usage, and a resin surface at a higher usage. It has been found that the initial bonds provided by the bonding particles with the fibrous component of the material just mentioned are released sufficiently by the heat in hot compression molding to enable the fibers more freely to participate in the flow of material within the dies under the molding pressures, thus filling mold spaces with fiber and resin, where such mold spaces were not previously filled by the preform.

The present method distinguishes from, and possesses advantgaes over, the water suspension method of mat formation referred to above. In the latter method, partial hydration of the fibers generally occurs which renders them mutually adherent whereby they tend to bond together in a mass of greater or less density, depending on the applied pressure. In the present invention which contemplates the formation of fibers in a non-hydrated condition, the fibers are mutually non-adherent, but are caused to adhere by use of the bonding and matrix-forming additive supplied to, and distributed throughout the low density mat, preferably concurrently with the formation of the mat. The heat softenable bonding material of the present invention thus liberates the bonded fibers of the preform under the influence of the heat of molding operations to avoid rupturing the fibers within the mold under the applied molding pressures.

The preferred "perform" is one which is compressed after or during the initial integration of the mat materials by heat. However, regardless of the exact technique of employing heat or pressure or both, the moldable integrated mat of fiber and thermally-moldable binder, is, generically, the preform of the present invention.

The present application is a division of applicant's Serial No. 563,209, filed November 13, 1944, now abandoned.

I claim:

1. The method of making moldable preform material containing hot-moldable binder and vegetable fibers, which comprises continuously depositing upon a moving receiving member from a gaseous suspension entities of dry finely divided solid heat-softenable binder and dry substantially individualized vegetable fibers and thereby forming them into a loose unbonded mat having a density not over 4 pounds per cubic foot, said fibers and binder being in proportion to form a cold rigid body after hot-molding at substantially maximum compression, said solid binder being normally non-adhesive and capable of softening to a condition adhesive to the fiber at an elevated temperature to which the fibers may be heated without destruction of their fibrous character, and bonding the fibers of the mat to form a structure having a density ranging from said density of formation to a density up to about 40 pounds per cubic foot by applying heat at a non-fusing temperature for the binder and of intensity to effect surface-tackiness of said binder, whereby to unite the fibers one to another by said individual binder entities and to fix the major portion of all the originally separate entities of the original mat into a resultingly strengthened bonded mat.

2. The method of making moldable preform material containing moldable binder and vegetable fibers, which comprises continuously depositing upon a moving receiving member from a gaseous suspension entities of dry finely divided solid heat-softenable binder and dry substantially individualized vegetable fibers and thereby forming them into a loose unbonded mat having a density not over 4 pounds per cubic foot, said fibers and binder being in proportion to form a cold rigid body after hot-molding at substantially maximum compression, said solid binder being normally non-adhesive and capable of softening to a condition adhesive to the fiber at an elevated temperature to which the fibers of the mat may be heated without destruction of their fibrous character, bonding the fibers of the mat to form a structure having a density of not over 4 pounds per cubic foot by applying heat at a non-fusing temperature for the binder and of intensity to effect surface-tackiness of said binder, whereby to unite the fibers one to another by said binder entities and to fix the major portion of all of the originally separate entities of the original mat into a resultingly strengthened and flexible bonded mat, and thereafter compressing the mat to any density from 4 to about 40 pounds per cubic foot for use as a molding preform.

3. The method of making moldable preform material containing moldable binder and vegetable fibers, which comprises continuously depositing upon a moving receiving member from a gaseous suspension entities of dry finely divided solid heat-softenable binder and dry substantially individualized vegetable fibers, and thereby forming them into a loose unbonded mat having a density not over 4 pounds per cubic foot, said fibers and binder being in proportion to form a cold rigid body after hot-molding at substantially maximum compression, said solid binder being normally non-adhesive and capable of softening to a condition adhesive to the fiber at an elevated temperature to which the fibers may be heated without destruction of their fibrous character, bonding the fibers of the mat to form a structure having a density of not over 4 pounds per cubic foot by applying heat at a non-fusing temperature for the binder and of intensity to effect surface-tackiness of said binder, whereby to unite fibers one to another by said binder entities and to fix the major portion of all of the originally separate entities of the original mat into a resultingly strengthened and flexible bonded mat, and thereafter converting said mat into a moldable preform at any density from 4 to about 40 pounds per cubic foot by compression at a tackiness-producing temperature.

4. The method of making moldable preform material containing moldable binder and vegetable fibers, which comprises continuously depositing upon a moving receiving member from a gaseous suspension entities of dry finely divided solid heat-softenable binder and dry substantially individualized vegetable fibers and thereby forming them into a loose unbonded mat having a density of less than 4 pounds per cubic foot, said fibers and binder being in proportion to form a rigid cold body after hot-molding at substantially maximum compression, said solid binder being normally non-adhesive and capable of softening to an adhesive condition on the fiber at an elevated temperature to which the fibers may be heated without destruction of their fibrous character, bonding the fibers of the mat to form a structure having a density less than 4 pounds per cubic foot by applying heat at a non-fusing temperature for the binder and of intensity to effect surface-tackiness of said binder, whereby to unite fibers one to another by said binder entities and to fix the major portion of all of the originally separate entities of the original mat into a resultingly strengthened and flexible bonded mat, and thereafter compressing the mat to any density from 4 to about 40 pounds per cubic foot for use as a molding preform.

5. The method of claim 1 wherein the fibers are derived from wood and wherein there are by weight at least 35 parts of said binder to 65 parts of said fiber, whereby the mass at the ultimate density of maximum compression is substantially a solid body.

6. The method of claim 2 wherein the fibers are derived from wood and wherein there are by weight at least 35 parts of said binder to 65 parts of said fiber, whereby the mass at the ultimate density of maximum compression is substantially a solid body.

7. The method of claim 3 wherein the fibers are derived from wood and wherein there are by weight at least 35 parts of said binder to 65 parts of said fiber, whereby the mass at the ultimate density of maximum compression is substantially a solid body.

8. The method of claim 4 wherein the fibers are derived from wood and wherein there are by weight at least 35 parts of said binder to 65 parts of said fiber, whereby the mass at the ultimate density of maximum compression is substantially a solid body.

CLARK C. HERITAGE.

REFERENCES CITED

The following references are of record in the file of this patent:

UNITED STATES PATENTS

| Number | Name | Date |
| --- | --- | --- |
| 758,246 | Goldman | Apr. 26, 1904 |
| 1,461,337 | Weiss | July 10, 1923 |
| 1,923,195 | Finck | Aug. 22, 1933 |
| 2,057,167 | Sherman | Oct. 13, 1936 |
| 2,288,072 | Collins | June 30, 1942 |
| 2,372,433 | Koon | Mar. 27, 1945 |